United States Patent [19]
Castel

[11] Patent Number: 5,722,240
[45] Date of Patent: Mar. 3, 1998

[54] BOOSTED BRAKING DEVICE WITH REDUCED TRAVEL

[75] Inventor: Philippe Castel, Paris, France

[73] Assignee: Bosch Systems De Freinage, Drancy, France

[21] Appl. No.: 581,560

[22] PCT Filed: Dec. 13, 1995

[86] PCT No.: PCT/FR95/01664

§ 371 Date: Jan. 16, 1996

§ 102(e) Date: Jan. 16, 1996

[87] PCT Pub. No.: WO96/22208

PCT Pub. Date: Jul. 25, 1996

[30] Foreign Application Priority Data

Jan. 18, 1995 [FR] France ............... 95 00489

[51] Int. Cl.$^6$ ........................... B60T 11/224
[52] U.S. Cl. .................................. 60/577
[58] Field of Search ........................ 60/576, 577

[56] References Cited

U.S. PATENT DOCUMENTS

| | | | |
|---|---|---|---|
| 2,587,023 | 2/1952 | Allyn | 60/577 |
| 2,820,346 | 1/1958 | Cook | 60/577 |
| 5,475,978 | 12/1995 | Gautier et al. | 60/553 |

Primary Examiner—F. Daniel Lopez
Attorney, Agent, or Firm—Leo H. McCormick, Jr.

[57] ABSTRACT

A boosted braking device for a motor vehicle having a master cylinder (200) and a pneumatic booster (100). The pneumatic booster (100) is capable of being operated by an operating rod (28) controlling the opening of a valve (26) in order to actuate a main hydraulic piston (34) in the master cylinder (200). The booster (100) has a rigid casing (10) divided in a leaktight fashion into first (12) and second (14) chambers by a moving partition (16) capable of driving a pneumatic piston (22) which can move relative to the casing (10). The main hydraulic piston (34) includes a hollow moving cylinder (38) having a secondary piston (40) which slides in a leaktight fashion in the interior thereof. The moving partition (16) is held fast to the moving cylinder (38) and is slidingly mounted on the pneumatic piston (22) so as to slide relative to the moving cylinder (38) in a forward direction over an axial distance (L) from an initial position of abutment against the rear of the pneumatic piston to a final position in which the moving cylinder (38) abuts the secondary piston (40). An annular piston (70) is held fast to the main hydraulic piston (34) when the travel of the annular piston (70) in bore (62,64) is less than the axial distance (L) while the annular piston (70) is capable of sliding over the main hydraulic piston (34) when the travel of the annular piston (70) in the bore (62,64) is greater than the axial distance (L) to obtain the maximum development of braking forces.

12 Claims, 2 Drawing Sheets

BOOSTED BRAKING DEVICE WITH REDUCED TRAVEL

The present invention relates to a boosted braking device of the type used for the braking of motor vehicles.

BACKGROUND OF THE INVENTION

Such braking devices have been known for a long time and conventionally comprise, on the one hand, a master cylinder filled with a brake fluid and equipped with a main hydraulic piston designed to receive an actuation force composed of an input force and of a boost force, both acting in an axial direction and, on the other hand, a pneumatic booster capable of being operated through the application of the input force to an operating rod controlling the opening of a valve, in order to exert the actuation force on the main hydraulic piston, the booster including a rigid casing divided in leaktight fashion into two chambers by means of a moving partition capable of being urged by a difference in pressure, between the two chambers, resulting from the opening of the valve and of driving a pneumatic piston which can move relative to the casing and which carries the valve, the input force being transmitted via a reaction disk against which the pneumatic piston also bears in order to supply at least some of the boost force to it.

A device of this type is well known in the prior art and is described, for example, in document U.S. Pat. No. 4,491,058.

For a long time it has been sought to improve these devices so that the total travel of the operating rod, and therefore the total travel available for the brake pedal, will be the result of a compromise between two contradictory parameters, so as to obtain what has become known in the art as good pedal feel.

In fact, the travel of the operating rod has to be just sufficient for the driver to be able to control the deceleration of the vehicle during braking in an optimum fashion. However, the total travel of the operating rod is necessarily extended by a relatively significant initial travel during which the hydraulic pressure in the braking circuit reaches a minimum value, beyond which any increase in pressure will result in an effective braking action.

SUMMARY OF THE INVENTION

In order to solve this problem, a solution has already been proposed, for example in document FR-A-2,696,141, (U.S. Pat. No. 5,475,978) corresponding to the preamble of the main claim and according to which the main hydraulic piston of the master cylinder itself includes a hollow moving cylinder communicating with the master cylinder, which receives at least some of the boost force and inside which a secondary hydraulic piston capable of receiving at least the input force slides, over an axial distance L, in a leaktight fashion and in the axial direction, the moving partition being slidably mounted on the pneumatic piston so as to be able to slide over the axial distance L relative to it in the direction of the master cylinder, from an initial relative position in which it is in abutment toward the rear against the pneumatic piston and bearing at least indirectly on the moving cylinder toward the front, when it is urged by a pressure difference.

Such a solution makes it possible to obtain the minimum braking pressure in response to a very small initial travel of the operating rod, which initial travel may even be imperceptible to the driver of the vehicle.

This solution does, however, involve an increase in the travel of the main piston of the master cylinder, and correspondingly an increase in the axial length of the latter, and consequently an increase in the length of the braking device, whose total overall size may prevent it from being fitted in the engine compartment of some vehicles.

The object of the present invention is therefore to provide a boosted braking device whose effectiveness comes into play right at the beginning of braking, that is to say after a very short initial travel of the brake pedal, and the overall size of which is not greater than that of a conventional braking device as illustrated, for example, by the first above mentioned document.

To this end, the invention provides a boosted braking device of the type defined above, in which an annular piston is held fast to the main hydraulic piston when the travel of the latter in the bore is less than the axial distance L, the annular piston being capable of sliding over the main hydraulic piston when the travel of the latter in the bore is greater than the axial distance L.

In that way, the main hydraulic piston has a cross section which varies as a function of its position in the bore, this cross section being appreciably greater over the first part of its travel. Such an enlarged cross section thus makes it possible to obtain the minimum braking pressure desired after a travel of the piston corresponding to the axial distance L.

Other objects, features and advantages of the invention will emerge clearly from the description which follows of one embodiment given by way of non-limiting indication with reference to the appended drawings.

DETAILED DESCRIPTION OF THE INVENTION

Figure 1:
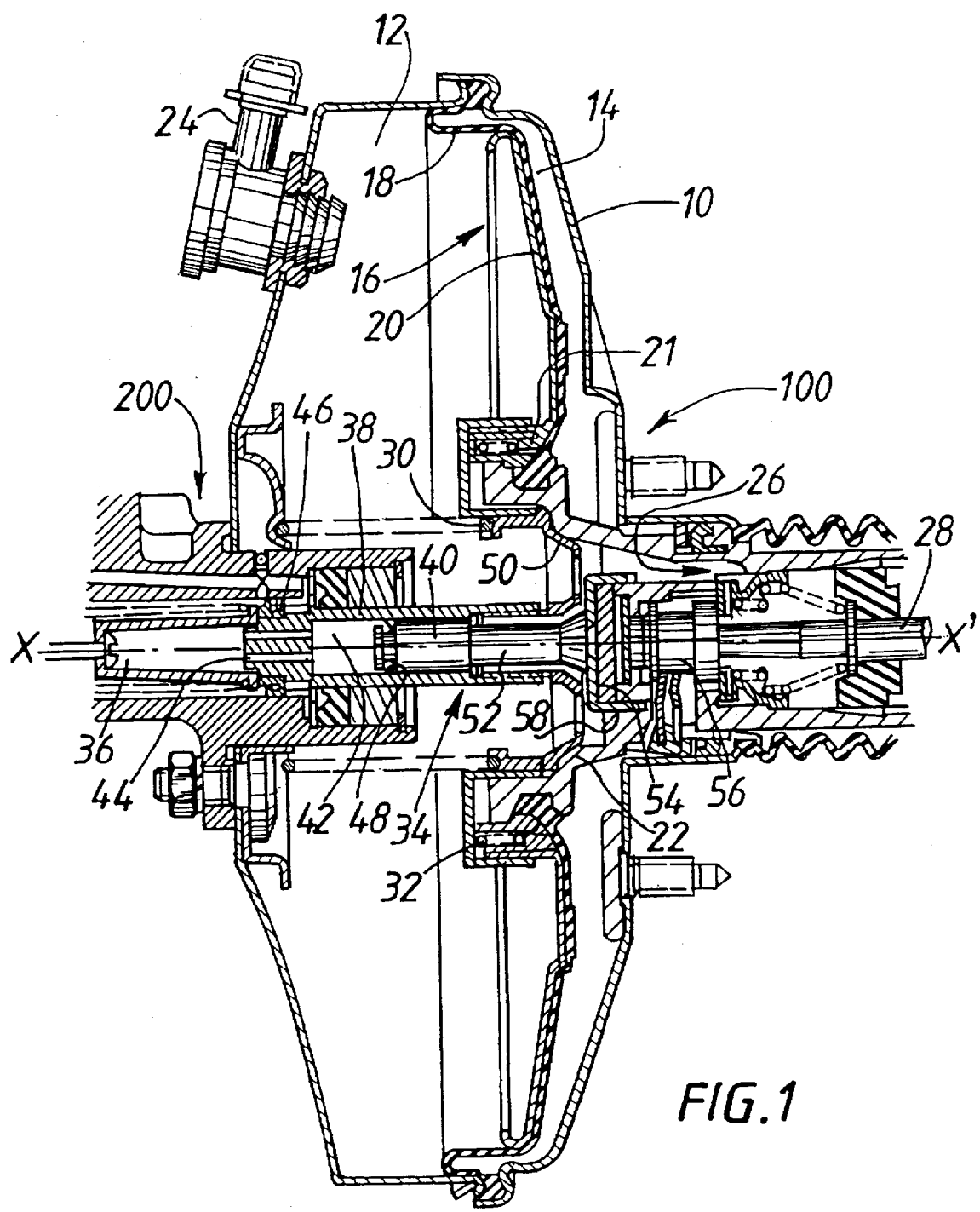
FIG. 1 is a view in part section of a boosted braking device of the type known, for example, from the second above mentioned document.

FIG. 1 represents a view in part section of a boosted braking device consisting of a pneumatic brake booster denoted overall by the reference 100, and of a master cylinder, denoted overall by the reference 200.

The booster 100 is designed to be fastened in the usual way to a dividing bulkhead between an engine compartment and the cabin of a vehicle, and to be actuated by a brake pedal situated in this cabin. The master cylinder 200 controlling the hydraulic braking circuit of the vehicle is designed to be fastened to the booster 100.

By convention, that part of the braking device which points toward the master cylinder 200 is termed the "front", and that part which points toward the brake pedal is termed the "rear". In the figures, the front is thus to the left and the rear to the right.

The booster 100 itself comprises a casing 10 in the form of a shell of axis X-X', divided in leaktight fashion into a front chamber 12 and a rear chamber 14 by a moving partition structure 16 comprising a rolling seal 18 and a rigid skirt 20, both connected to a pneumatic piston 22, the whole being able to move inside the casing 10 along the axis X-X'.

More precisely, the moving partition 16 is mounted, preferably via the central part 21 of its rigid skirt 20, so that it can slide freely relative to the pneumatic piston 22.

Figure 2:
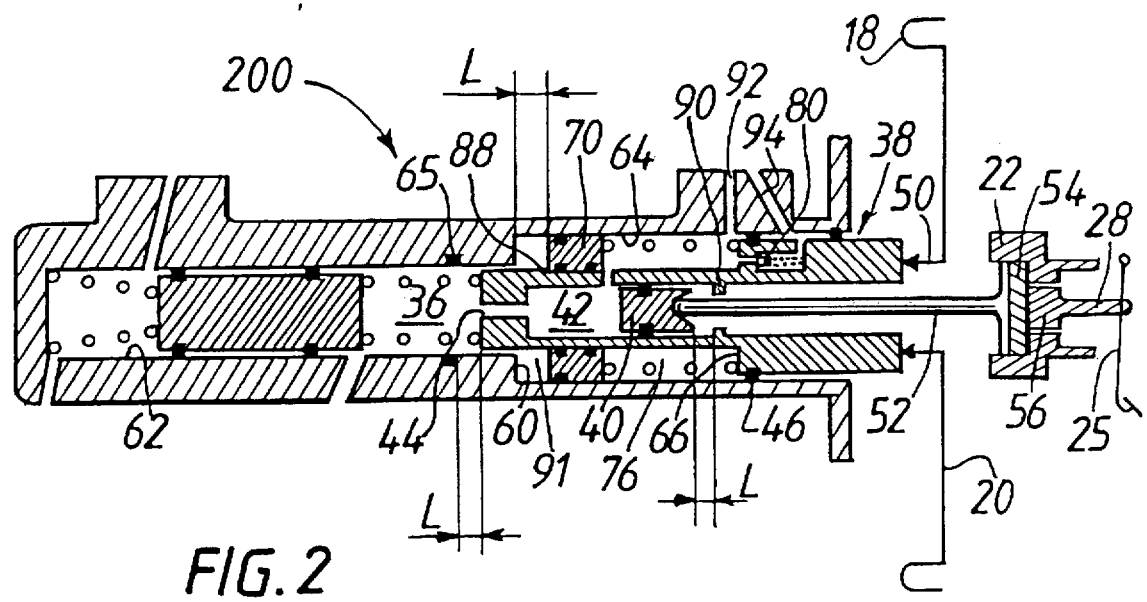
FIG. 2 is a diagrammatic view in part section of a boosted braking device in accordance with the present invention, represented in the position of rest.

The front chamber 12 is permanently connected to a source (not represented) of partial vacuum via a non-return valve 24. The pressure in the rear chamber 14 is controlled by a valve 26, operated by an operating rod 28 located along the axis X–X' and connected to a brake pedal 25 (FIG. 2).

The piston 22 is urged toward its rear position of rest, to the right, by a spring 30 bearing on the front face of the casing 10, and the rigid skirt 20 is itself urged toward its rear position of rest, to the right, by a spring 32 bearing on the piston 22.

The master cylinder 200 includes a main hydraulic piston 34 which is composite and which comprises, on the one hand, a moving and hollow cylinder 38 and, on the other hand, a secondary hydraulic piston 40.

The internal volume 42 of the moving cylinder 38 communicates with the internal volume 36 of the master cylinder via at least one orifice such as 44 made in the moving cylinder 38 in an axial direction.

Apart from the passage of fluid that these passages 44 between the internal volume 36 of the master cylinder 200 and that of the moving cylinder 38 permit, this moving cylinder 38 slides in leaktight fashion in the master cylinder 200, sealing being obtained by virtue at least of one annular collar 46.

The second hydraulic piston 40, for its part, slides inside the moving cylinder 38 in a leaktight fashion by virtue of an annular collar 48. Moreover, the moving cylinder 38 is held fast to the rigid skirt 20 by means of a connection piece 50.

The secondary hydraulic piston 40 constitutes the axial extension of a push rod 52 of the booster, capable of transmitting to it, on the one hand, the input force exerted on the operating rod 28 and, on the other hand, a fraction of the boost force developed by the pneumatic piston 22, these forces being transmitted, in a way known per se, via a reaction disk 54 on one face of which this pneumatic piston and a plunger 56 actuated by the operating rod bear and the other face of which bears on a bearing surface 58 held fast to the push rod 52.

Provision may be made for equipping the cylinder 36 with a limit stop for limiting the free sliding of the secondary hydraulic piston 40 relative to the hollow moving cylinder 38, and consequently limiting the free sliding of the moving partition 16 relative to the pneumatic piston 22. The same limitation may be obtained by means of limit stops provided on the central part 21 of the rigid skirt 20 and on the pneumatic piston 22.

The operation of the device which has just been described is as follows.

When the operating rod 28 is in the position of rest represented in FIG. 1, that is to say to the right, the valve 26 normally establishes communication between the two chambers 12 and 14 of the booster.

As the rear chamber 14 is then subjected to the same partial vacuum as the front chamber 12, the piston 22 and the rigid skirt 20 are pushed back to the right, into the position of rest, by the springs 30 and 32 respectively.

Actuating the operating rod 28 toward the left has the effect, firstly, of displacing the valve 26 so that it isolates the chambers 12 and 14 from each other then, secondly, of displacing this valve so that it opens the rear chamber 14 to atmospheric pressure.

The difference in pressures prevailing in the two chambers 12 and 14, then felt by the seal 18, exerts a thrust on the moving partition 20, which thrust tends to displace them forward. As the preload at rest on the spring 32 is normally less than that on the spring 30, the moving partition 20 moves by itself, compressing the spring 32.

The moving partition 20 in its movement drives the main hydraulic piston 38 via the connection piece 50, thus causing the hydraulic pressure in the internal volume 36 of the master cylinder 200 to increase, which pressure rises sharply and becomes established, through the circulation of hydraulic fluid through the passages 44, in the internal volume 42 of the moving cylinder 38.

The movement of the moving partition 20 continues until it comes into abutment on the pneumatic piston 22, or until the hollow cylinder 38 comes into abutment on the secondary hydraulic piston 40. The pressure obtained in this operating phase corresponds to the minimum pressure required to initiate braking. This minimum pressure has thus been obtained for a very small travel of the operating rod.

At this instant there is no longer any relative movement between the skirt 20 and the piston 22 which then move together when the pneumatic piston 22 itself moves, that is to say if the driver of the vehicle increases his force on the brake pedal.

The pressure in the internal volume 42 additionally causes there to appear, on the secondary hydraulic piston 40, a force which tends to push this secondary piston 40 back toward the operating rod 28, that is to say to the right in FIG. 1. This force on the secondary hydraulic piston thus constitutes a reaction force which depends on the boost force, and which opposes the force transmitted through the reaction disk 54, allowing the boost force to be controlled by the input force by means of a compound reaction, that is to say one which is both hydraulic and mechanical.

Such a device therefore makes it possible to obtain a relatively high pressure in the master cylinder, owing to the fact that the skirt 20 and the main hydraulic piston 34 of the master cylinder have covered a travel which is greater than that of the operating rod 28, some of this travel of the piston 34 having been imperceptible to the driver. As a result, the length of the master cylinder must therefore be such that it allows the main hydraulic piston 34 to cover this additional travel of the piston 34 relative to that of the operating rod 28 supplemented by the travel necessary to obtain the desired effective braking effort and pressure.

The object of the present invention is precisely to avoid this drawback, and to allow the braking device to operate as has just been described, and therefore allow the main hydraulic piston 34 to cover an additional travel in order to obtain the minimum braking pressure without thereby appreciably increasing the total length of the master cylinder.

Figure 3:
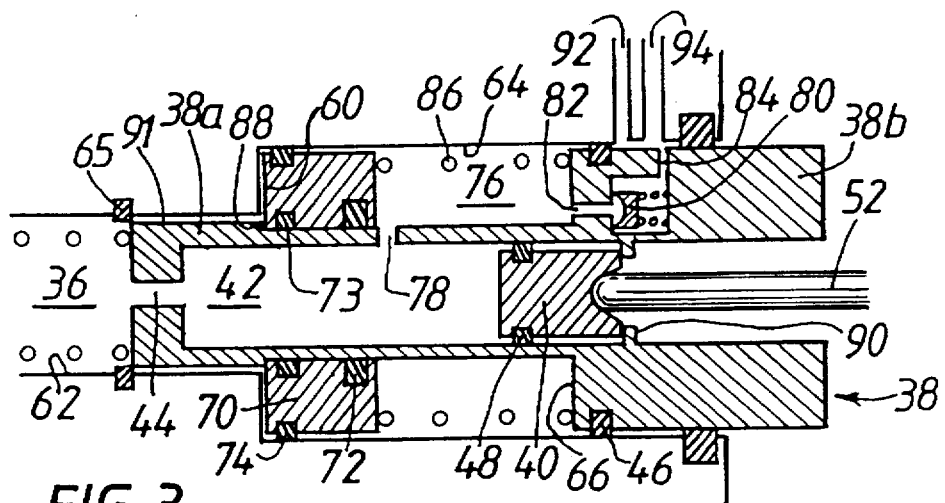
FIG. 3 is a view similar to that of FIG. 2, on a larger scale, the device being represented in a second position.
Figure 4:
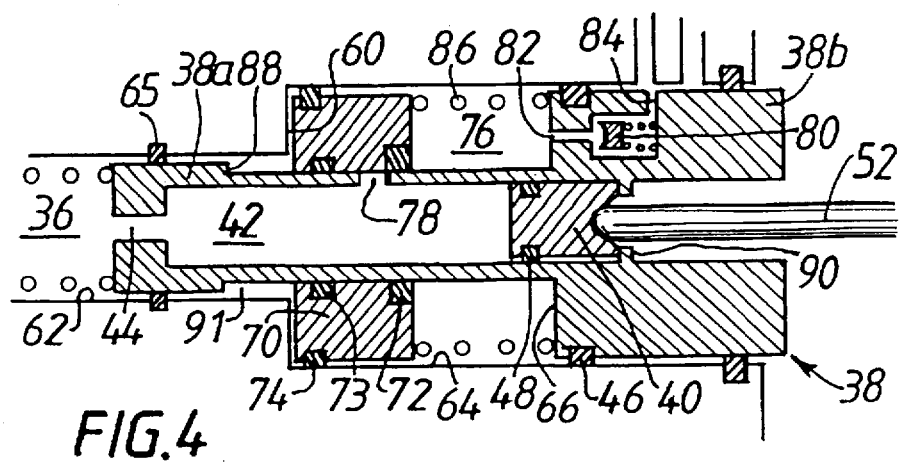
FIG. 4 is a view similar to that of FIG. 3, the device being represented in a third position.

As represented in FIGS. 2 to 4, the bore in which the hollow cylinder 38 slides is stepped, and includes a radial shoulder 60 between the smaller-diameter front part 62 and the larger-diameter rear part 64.

The hollow moving cylinder 38 is itself stepped and includes a radial shoulder 66 between its front part 38a and rear part 38b, these parts interacting respectively with the bore parts 62 and 64.

An annular seal 65 is located in the bore part 62 and is capable of interacting with the front part 38a of the cylinder 38 after a predetermined travel of the latter, as will be seen later.

An annular piston 70 is capable of sliding in leaktight fashion over the cylinder 38a by virtue of two seals 72 and 73, and in the bore 64 by virtue of a seal 74. The annular piston 70, the bore 64, the shoulder 66 and the cylinder 38a thus define a variable-volume annular chamber 76 capable of communicating with the internal volume 42 of the moving cylinder 38 via at least one radial passage 78.

The cylinder 38 also includes a calibrated non-return valve 80 located between a passage 82 (FIGS. 3 and 4) for communication with the rear chamber 76, and a radial passage 84 emerging at the external surface of the part 38b of the cylinder 38, behind the annular collar 46.

Finally, a compression spring 86 is located in the chamber 76 between the shoulder 66 of the cylinder 38 and the annular piston 70, in order to urge the latter permanently forward. A limit stop 88 consisting, for example, of a shoulder is formed on the part 38a of the cylinder 38 in order to define the position of rest of the annular piston 70 relative to the cylinder 38. A limit stop 90 is likewise formed inside the cylinder 38 in order to limit the backward movement of the secondary hydraulic piston 40 relative to the cylinder 38.

As can be seen in FIG. 2, in the position of rest, the limit stop 88 keeps the annular piston 80 at an axial distance L from the shoulder 60 of the bore, and the limit stop 90 is situated at the same axial distance L behind the secondary hydraulic piston 40. Furthermore, the annular seal 65 is at an axial distance L in front of the front end of the part 38a of the cylinder 38.

At rest, all the moving parts occupy their rear position represented in FIG. 2, except for the annular piston 70 which is bearing forward on the limit stop 88. The internal volume 36 of the master cylinder, the internal volume 42 of the moving cylinder 38, the volume 91 situated between the annular piston 70 and the shoulder 60 of the annular chamber 76 communicate with each other and with a low-pressure fluid reservoir (not represented) via an expansion orifice 92.

As seen earlier, actuating the brake pedal 25 causes the operating rod 28 and the plunger 56 to move to the left. The valve 26 firstly isolates the chambers 12 and 14 from one another then, secondly, opens the fear chamber 14 to atmospheric pressure.

The difference in the pressures prevailing in the two chambers 12 and 14 exerts on the moving partition 20 a thrust which tends to displace it forward by itself, the pneumatic piston 22 being kept in its rear position under the effect of the preload of the spring 32.

The moving partition 20 in its movement drives the main hydraulic piston 38 via the connection piece 50. As soon as the annular collar 46 has gone past the expansion orifice 92, the hydraulic pressure in the internal volume 36 of the master cylinder and internal volume 42 of the cylinder 38, in the volume 91 and in the annular chamber 76 starts to rise.

As the non-return valve 80 has been calibrated not to open in this operating phase, the annular piston 70 accompanies the cylinder 38 in its movement under the action of the spring 86, so that the volume swept by this cylinder 38/piston 70 moving gear is defined by the cross section of the bore 64, decreased by the cross section of the secondary hydraulic piston 40 which remains stationary during this operating phase.

This movement continues over the entire axial distance L, as does the increase in hydraulic pressure, until the annular piston 70 comes into abutment against the shoulder 60, the limit stop 90 inside the cylinder 38 almost simultaneously coming into contact with the secondary hydraulic piston 40, depending on the manufacturing tolerances, just like the front end of the part 38a of the cylinder 38 comes into interaction with the annular seal 65.

The various elements of the master cylinder are then in the position which has been represented in FIG. 3. The volume 91 is therefore isolated from the rest of the master cylinder as it is contained by the seals 73, 74 and 65. Furthermore, the non-return valve 80 is calibrated to open at the pressure level reached at this moment in operation.

At this moment there can therefore no longer be any relative movement between the cylinder 38 and the secondary piston 40, or between the skirt 20 and the piston 22 which therefore move together when the pneumatic piston 22 itself moves, that is to say if the driver of the vehicle increases his force on the brake pedal.

In this situation, the cylinder 38 and the secondary piston 40 move together, so that the radial passage 78 goes past the annular seal 72 while remaining behind the seal 73, thus closing off communication between the annular chamber 76 and the internal volume 42 of the hollow cylinder 38, on the one hand, and the internal volume 36 of the master cylinder on the other hand, shortly after the cylinder 38 has travelled the axial distance L increased by the axial length of the seals 72 and 65. Now being open, the valve 80 allows the fluid contained in the annular chamber 76 to return to the reservoir via the radial passage 84 and the expansion orifice 92 or a compensation orifice 94 communicating with the low-pressure fluid reservoir, the spring 86 becoming progressively compressed.

The pressure in the volumes 36 and 42 thus continues to rise, the volume swept by this cylinder 38/secondary piston 40 moving gear being defined by the cross section of the front part 38a of the cylinder 38 sliding in the annular piston 70, which remain stationary in this operating phase. Advantageously, provision may be made for this cross section to be equal to the cross section of the smaller-diameter bore part 62, this provision making it possible to use a tandem master cylinder as represented in FIG. 2.

As seen above, this pressure acting on the secondary hydraulic piston 40 creates a reaction force which depends on the boost force and allows the boost force to be controlled by the input force, by means of a compound reaction, that is to say one which is both hydraulic and mechanical.

The various elements of the master cylinder are therefore in the position which has been represented in FIG. 4. The operation of the master cylinder 200 and of the booster 100 is therefore identical to that of a conventional boosted braking device.

When the driver of the vehicle releases his effort on the brake pedal in order to terminate the braking action, all the moving elements are returned to the rear. In particular, the non-return valve 80 closes again so that the volume of the annular chamber 76 cannot increase. The annular piston 70 therefore accompanies the cylinder 38 in its backward movement, until the annular collar 46 uncovers the expansion orifice 92.

At this moment, the front end of the part 38a of the cylinder 38 has stopped interacting with the annular seal 65, so that communication between the volume 91 and the rest of the master cylinder has been reestablished and so that the spring 86 can push the annular piston 70 back forward, to bear against the limit stop 88. All the elements therefore resume their position of rest represented in FIG. 2, thus allowing another braking action as has just been described.

It can therefore clearly be seen that a boosted braking device has been achieved in accordance with the given objective of the present invention. Indeed, in the first operating phase for obtaining the minimum effective braking pressure, during which the moving partition 16 slides relative to the pneumatic piston 22, and in which the cylinder 38 slides over the secondary hydraulic piston 70, that is to say for an initial travel L of the moving partition 16, the volume of fluid displaced by the cylinder 38/piston 70 moving gear is appreciably greater than the volume of fluid displaced by the cylinder 38/secondary piston 40 moving gear during the second operating phase in which all the elements move together, except for the annular piston 70, in order to obtain the desired braking action and pressure.

Everything therefore happens as though the main hydraulic piston of the master cylinder had a cross section varying along its travel in its bore, its cross section being greater over the first part L of its travel than over the second part, after it has covered the axial distance L.

Thus, as a function of the features of the braking system of a type of vehicle to which the boosted braking device of the invention is to be fitted, and through a careful selection of the transverse sections of the annular piston 70 and of the front part 38a of the cylinder 38, of the axial distance L between the annular piston 70 and the shoulder 60 and between the limit stop 90 and the secondary piston 40 at rest, and of the calibration of the non-return valve 80, it is indeed possible therefore to obtain the minimum effective braking pressure without having to extend the length of the master cylinder correspondingly, and while having a travel of the main hydraulic piston 34 equipped with the annular piston 70 greater than the travel of the operating rod 28.

Of course, the invention is not limited to the embodiments which have been described, but can in contrast receive numerous modifications which will be obvious to the person skilled in the art, without departing from the scope of the appended claims.

I claim:

1. A booster braking device for a motor vehicle, comprising: a master cylinder and a pneumatic booster, said master cylinder being filled with a brake fluid and equipped with a main hydraulic piston designed to receive an actuation force composed of an input force and of a boost force, said input force and boost force acting in an axial direction, said pneumatic booster being capable of operating by application of said input force being applied to an operating rod controlling an opening of a valve in order to exert said boost force on said main hydraulic piston, said booster having a rigid casing divided in leaktight fashion into first and second chambers by means of a moving partition capable of being urged by a difference in pressure between said first and second chambers, said difference in pressure resulting from the opening of said valve, said booster having a pneumatic piston which can move relative to the casing and carries said valve, said pneumatic piston contributes at least to transmitting the boost force to said main hydraulic piston, said main hydraulic piston of the master cylinder having a hollow moving cylinder with an internal volume and which slides in a bore and communicating with said master cylinder, said hollow moving cylinder receives at least some of said boost force, a secondary hydraulic piston located in said hollow moving cylinder receiving at least said input force slides over an axial distance in leaktight fashion and in said axial direction, said moving partition being slidably mounted on the pneumatic piston so that it can slide over a relative axial distance in the direction of said master cylinder from an initial relative position in which said moving partition is in abutment against the rear of said pneumatic piston and bearing at least indirectly on said moving cylinder toward the front in response to said pressure difference, said device being characterized in that said bore is stepped and includes a radial shoulder between a smaller-diameter front part and a larger-diameter rear part; said hollow moving cylinder is stepped and includes a radial shoulder between a smaller-diameter front part and a larger-diameter rear part; an annular piston is held fast to said main hydraulic piston when the travel of said hollow moving cylinder in said bore is less than said axial distance, said annular piston is capable of sliding in leaktight fashion over said front part of said hollow moving cylinder and in said rear part of said stepped bore, said annular piston being capable of sliding over said main hydraulic piston when the travel of said hollow moving cylinder in said bore is greater than said axial distance, said annular piston, said rear part of the stepped bore, said shoulder and said front part of said hollow moving cylinder together define a variable-volume annular chamber, said variable-volume annular chamber being capable of communicating with said internal volume of said hollow moving cylinder via at least one radial passage.

2. The boosted braking device according to claim 1, characterized in that a communication path between said variable-volume annular chamber and said internal volume of said hollow moving cylinder is interrupted shortly after said hollow moving cylinder has moved said axial distance.

3. The boosted braking device according to claim 2, characterized in that a calibrated non-return valve is located in a communication passage between said annular chamber and a low-pressure fluid reservoir.

4. The boosted braking device according to claim 2, characterized in that a compression spring is located in said annular chamber between said annular piston and said shoulder of said hollow moving cylinder.

5. The boosted braking device according to claim 1, characterized in that, at rest, a first limit stop formed on said front part of said hollow moving cylinder keeps said annular piston at said axial distance from said shoulder of said bore.

6. The boosted braking device according to claim 5, characterized in that, a second limit stop formed in the hollow moving cylinder is situated at the axial distance from a rear end of the secondary hydraulic piston.

7. A boosted braking device for a motor vehicle, comprising: a master cylinder filled with a brake fluid and equipped with a main hydraulic piston designed to receive an actuation force composed of an input force and of a boost force, said input force and boost force acting in an axial direction; and a pneumatic booster capable of being operated by the application of said input force to an operating rod for controlling the opening of a valve in order to exert said actuation force on said main hydraulic piston, said booster including a rigid casing divided in leaktight fashion into first and second chambers by means of a moving partition capable of being urged in said axial direction by a difference in pressure between said first and second chambers resulting from actuation of said valve, said partition on moving driving a pneumatic piston relative to said casing, said pneumatic piston carrying said valve and contributes at least to transmitting the boost force to said actuation force, said main hydraulic piston of said master cylinder including a hollow moving cylinder which slides in a bore and communicating with the master cylinder, said main hydraulic piston receiving at least some of said boost force, a secondary hydraulic piston located inside of said main hydraulic piston capable of receiving at least the input force and which slides over an axial distance in leaktight fashion in said axial direction, said moving partition being slidably mounted on said pneumatic piston so as to slide over a relative axial distance in a direction of the master cylinder from an initial relative position in which said moving partition is in abutment toward the rear against the pneumatic piston and bearing at least indirectly on the moving cylinder toward the front when urged by a pressure difference; an annular piston held fast to the main hydraulic piston when the travel of the main hydraulic piston in said bore is less than said axial distance, said annular piston being capable of sliding over the main hydraulic piston when the travel of said main hydraulic piston in said bore is greater than said axial distance, said bore being stepped and including a radial shoulder between a smaller diameter front part and a larger-diameter rear part, said hollow moving cylinder being stepped and having a radial shoulder between a smaller-diameter front part and a larger-diameter rear part, said annular piston being capable of sliding in leaktight fashion over said front part of said hollow moving cylinder and in said rear part of said stepped bore; said annular piston, said rear part of the stepped bore, said radial shoulder and said front part of the hollow moving cylinder together defining a variable-volume annular chamber, characterized in that said variable-volume annular chamber is capable of communicating with an internal volume of said hollow moving cylinder via at least one radial passage.

8. The boosted braking device according to claim 7, characterized in that a communication path between said variable-volume annular chamber add said internal volume of said hollow moving cylinder is interrupted shortly after said hollow moving cylinder has covered said axial distance.

9. The boosted braking device according to claim 7, characterized in that a calibrated non-return valve is located in a communication passage between said annular chamber and a low-pressure fluid reservoir.

10. The boosted braking device according to claim 8, characterized in that a compression spring is located in said annular chamber between said annular piston and said radial shoulder of said hollow moving cylinder.

11. The boosted braking device according to claim 9, characterized in that, at rest, a first limit stop formed on said front part of said hollow moving cylinder keeps said annular piston at said axial distance from said shoulder of the bore.

12. The boosted braking device according to claim 11, characterized in that, a second limit stop formed in the hollow moving cylinder is situated at the axial distance from a rear end of the secondary hydraulic piston.

* * * * *